United States Patent
King

(10) Patent No.: US 9,087,182 B2
(45) Date of Patent: Jul. 21, 2015

(54) PASSWORD-BASED OPERATION OF A LOCKED COMPUTING DEVICE

(75) Inventor: Benjamin John King, Dallas, TX (US)

(73) Assignee: BlackBerry Limited, Waterloo, ON (CA)

( * ) Notice: Subject to any disclaimer, the term of this patent is extended or adjusted under 35 U.S.C. 154(b) by 224 days.

(21) Appl. No.: 13/038,640

(22) Filed: Mar. 2, 2011

(65) Prior Publication Data

US 2012/0226912 A1     Sep. 6, 2012

(51) Int. Cl.
G06F 21/00     (2013.01)
G06F 21/31     (2013.01)

(52) U.S. Cl.
CPC ...................................... G06F 21/31 (2013.01)

(58) Field of Classification Search
CPC ....................................................... G06F 21/31
See application file for complete search history.

(56) References Cited

U.S. PATENT DOCUMENTS

| | | | |
|---|---|---|---|
| 4,494,114 A | 1/1985 | Kaish et al. | |
| 5,537,544 A * | 7/1996 | Morisawa et al. | 726/19 |
| 5,923,841 A * | 7/1999 | Lee | 726/19 |
| 6,801,765 B1 | 10/2004 | Roo et al. | |
| 6,892,081 B1 | 5/2005 | Elomaa | |
| 7,069,580 B1 | 6/2006 | Deitz et al. | |
| 2005/0070276 A1 | 3/2005 | McGarry | |
| 2005/0116840 A1 | 6/2005 | Simelius | |
| 2006/0189345 A1 | 8/2006 | Suzuki et al. | |
| 2006/0190724 A1 | 8/2006 | Adams et al. | |
| 2006/0215360 A1 | 9/2006 | Lin et al. | |
| 2007/0011461 A1 | 1/2007 | Jeng | |
| 2007/0015490 A1 | 1/2007 | Munje et al. | |
| 2007/0167196 A1 | 7/2007 | Yamashita et al. | |
| 2007/0180515 A1 * | 8/2007 | Danilak | 726/16 |
| 2007/0234235 A1 | 10/2007 | Scott | |
| 2008/0016371 A1 | 1/2008 | Jiang et al. | |
| 2008/0060052 A1 | 3/2008 | Hwang et al. | |
| 2008/0108323 A1 | 5/2008 | Abe et al. | |
| 2010/0138297 A1 | 6/2010 | Fitzgerald et al. | |
| 2010/0138914 A1 | 6/2010 | Davis et al. | |
| 2011/0047368 A1 | 2/2011 | Sundaramurthy et al. | |

FOREIGN PATENT DOCUMENTS

| | | |
|---|---|---|
| EP | 1816580 A1 | 8/2007 |
| GB | 2324004 A | 10/1998 |

OTHER PUBLICATIONS

Extended European Search Report dated Jul. 13, 2011 from EP11156694.9.

(Continued)

*Primary Examiner* — Kambiz Zand
*Assistant Examiner* — Nega Woldemariam
(74) *Attorney, Agent, or Firm* — Fish & Richardson P.C.

(57) ABSTRACT

The present application relates to performing operations on a computing device having a restricted mode of operation and an unrestricted mode of operation. A first input sequence comprising a correct authentication code and a command code is obtained while in the restricted mode of operation. The device executes one or more special operations associated with the command code while the device remains in the restricted mode of operation. The device transitions to the unrestricted mode of operation upon obtaining a second input sequence comprising a correct authentication code, and in the unrestricted mode of operation the device may execute one or more regular operations.

29 Claims, 5 Drawing Sheets

(56) References Cited

OTHER PUBLICATIONS

Bhatt, N., "Nokia Mobile Phone Unlock & Hidden Feature codes—Rambling Thoughts Blog", Mar. 30, 2007, http://www.bhatt.id.au/blog/nokia-mobile-phone-service-codes-activate-hidden-features/, accessed Aug. 24, 2010.

Zeilenga, K. D., "Multiple Passwords per User in XMPP", Internet Draft, Mar. 2, 2009, http://tools.ietf.org/pdf/draft-zeilenga-xmpp-multi-passwd-00.pdf, accessed May 31, 2011.

SAP NetWeaver, "Multiple Usage of a Mobile Device", http://help.sap.com/saphelp_nw04/helpdata/en/cf/55c806342e0748ba6a6331a4240ff3/content.htm, accessed May 31, 2011.

Sap NetWeaver, "Defining User-Specific Data Filtering", http://help.sap.com/saphelp_nw04/helpdata/en/25/ef27b061f2fa4281a35d8404203271/frameset.htm, accessed May 31, 2011.

Wikipedia, "SecurID", http://en.wikipedia.org/wiki/SecurID, accessed May 31, 2011.

Office Action dated Jul. 23, 2014; in Canadian patent application No. 2,769,389.

Office Action mailed Oct. 1, 2013, in corresponding Canadian patent application No. 2,769,389.

\* cited by examiner

PASSWORD-BASED OPERATION OF A LOCKED COMPUTING DEVICE

BACKGROUND

1. Technical Field

The present application relates generally to the operation of a computing device in a locked or restricted mode.

2. Description of the Related Art

Computing or communication devices, such as computers, laptops, PCs, tablets, MP3 players and smartphones, are typically controlled through user input interfaces including touchscreens, buttons, keyboards, trackpads, trackballs, microphones and the like. To enhance security or conserve power, these devices may enter a "locked" state if no input has been received for a period of time, or if expressly instructed to enter the locked state. In the locked state, some or all of the device's input interfaces may be inoperable or non-responsive, thus reducing the likelihood of accidental operation of the device due to inadvertent actuation of an input interface, potentially reducing the power consumed by some or all of the input interfaces. In the locked state, access to functions or data on the device can be restricted; to access some or all of the device's functions or data, a security code such as a password or PIN may be required.

BRIEF DESCRIPTION OF THE DRAWINGS

In drawings which illustrate by way of example only embodiments of the present application.

DETAILED DESCRIPTION

Figure 1:
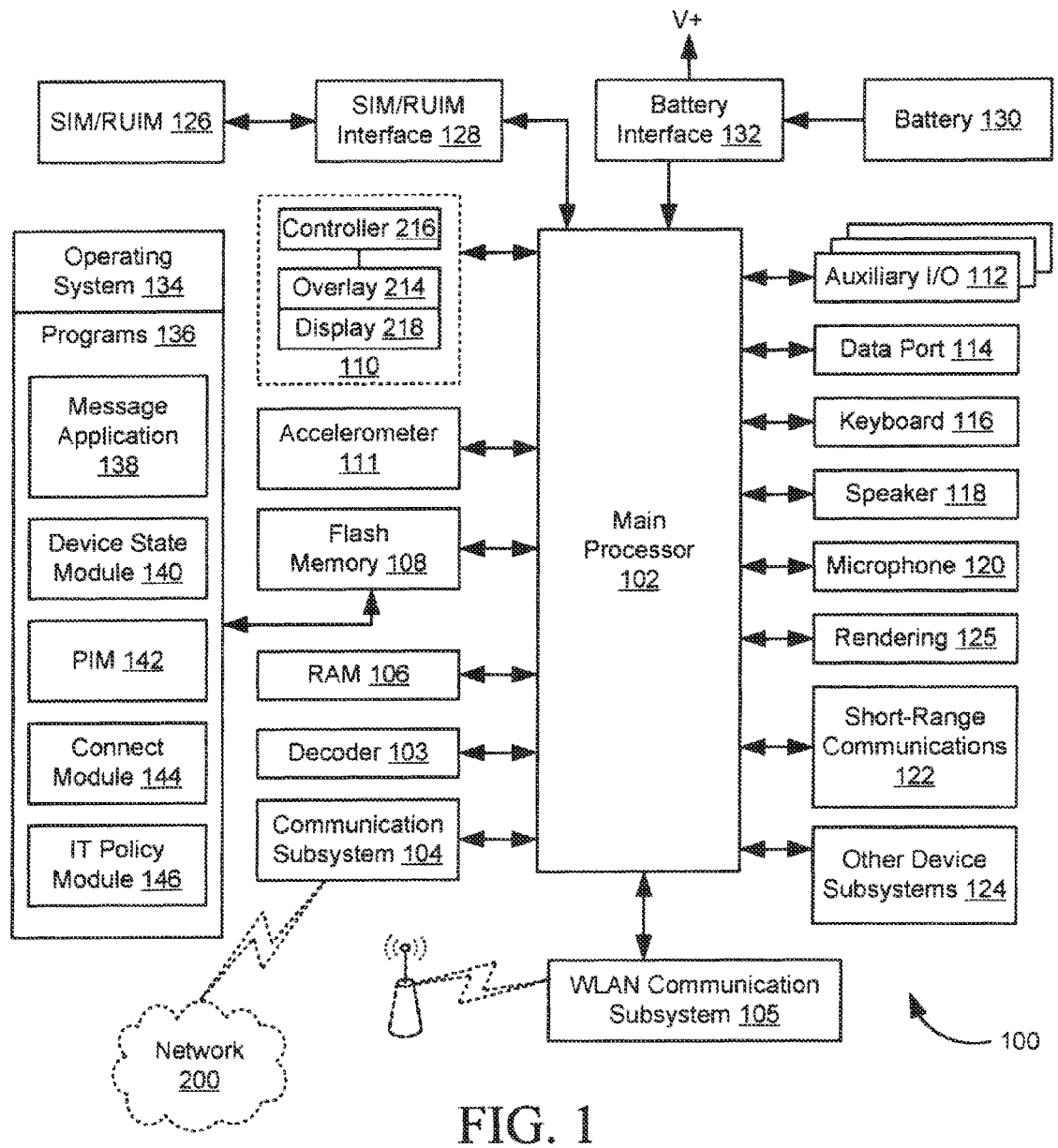
FIG. 1 is a block diagram of an embodiment of a mobile computing device.

The embodiments described herein provide a computing or communication device and a method for operating the device while it is in a locked state. These embodiments will be described and illustrated primarily in relation to a mobile wireless communication device. It will be appreciated by those skilled in the art, however, that this description is not intended to limit the scope of the described embodiments to mobile wireless communication devices. The methods and systems described herein may be applied to any appropriate computing device, communication device or data processing device. The device may be adapted to communicate with another communication or data processing device over a fixed or wireless connection, whether portable or wirelessly enabled or not, whether provided with voice communication capabilities or not. However, the device need not be adapted for such communications. The device may additionally or alternatively be adapted to process data and carry out operations on data in response to user commands for any number of purposes, including productivity and entertainment. Thus, the embodiments described herein may be implemented on computing devices including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, the device described herein may include any such device.

Accordingly, the embodiments described herein provide a method, comprising: receiving one of a plurality of security codes at a computing device via a user input interface while the computing device is in a locked state, a first one of the plurality of security codes comprising an authentication code which when received by the computing device causes the computing device to transition to an unlocked state, wherein access to data at the computing device is disabled in the locked state; and executing a command at the computing device when a second one of the plurality of security codes is received by the computing device in the locked state, said second security code comprising the authentication code and a command code associated with said command.

There is further provided a computing device, comprising a user input interface; a storage device for storing data; and a processor in operative communication with the user input interface and the storage device, the processor being configured to: receive one of a plurality of security codes at a computing device via a user input interface while the computing device is in a locked state, a first one of the plurality of security codes comprising an authentication code which when received by the computing device causes the computing device to transition to an unlocked state, wherein access to data at the computing device is disabled in the locked state; and execute a command at the computing device when a second one of the plurality of security codes is received by the computing device when in the locked state, said second security code comprising the authentication code and a command code associated with said command.

In an aspect, the computing device is in the locked state upon completion of said execution of said command.

In another aspect, the access comprises user interface access.

In still another aspect, user interface access to said data remains disabled while the command is executed.

In yet another aspect, access to data at the computing device is disabled by encryption of said data, and access to said data is enabled by decryption of said data.

Further, in another aspect, said data is encrypted using an encryption key, the encryption key being encrypted for storage at the computing device using the authentication code, wherein when access to said data is enabled, the authentication code comprised in the received first security code is used to decrypt the encryption key, and said decrypted encryption key is used to decrypt said data.

In still a further aspect, executing the command comprises launching an application associated with the command code at the computing device.

In yet a further aspect, executing the command comprises passing the command to an application associated with the command code executing at the computing device.

Further, the first one of the plurality of security codes may be the authentication code, or the command code may be a prefix to the authentication code in the second security code.

A computer program product is also provided, comprising a non-transitory computer readable medium storing code which, when executed, causes a computing device to carry out the methods described herein.

Figure 2:
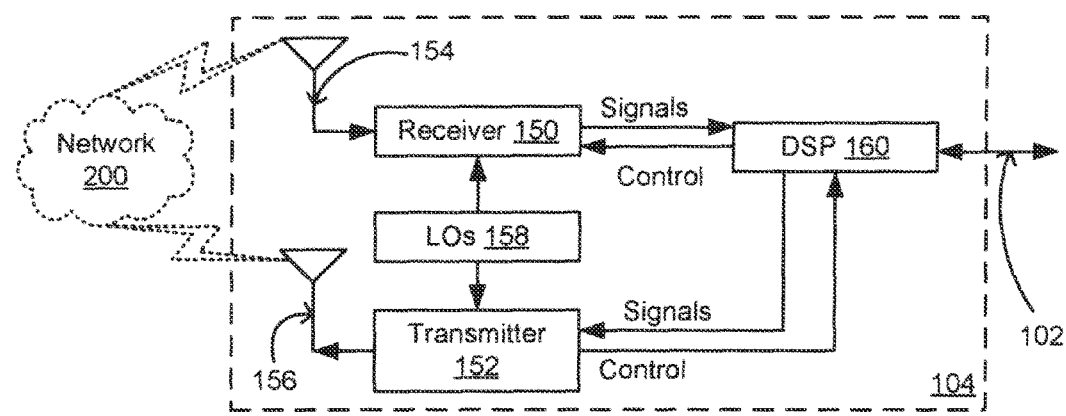
FIG. 2 is a block diagram of an embodiment of a communication subsystem component of the mobile device of FIG. 1.

The embodiments described herein for implementation on a computing device may be implemented on a communication device such as that illustrated in FIGS. 1 and 2. The communication device may communicate with other devices over a wireless communication system. The communication device 100 may be a mobile device with two-way communication and advanced data communication capabilities including the capability to communicate with other mobile devices or computer systems through a network of transceiver stations. The communication device 100 can also have voice communication capabilities. Throughout the specification, terms such as "may" and "can" are used interchangeably and use of any particular term should not be construed as limiting the scope or requiring experimentation to implement the claimed subject matter or embodiments described herein.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26× and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of the device 100.

In some embodiments, the user device 100 may comprise a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the device 100, although in some embodiments, additional buttons, variously shown in the figures or a trackpad, or other input means may be provided. In one embodiment, a transmissive TFT LCD screen 218 is overlaid with a clear touch sensor assembly 214 that supports single and multi-touch actions such as tap, double-tap, tap and hold, tap and drag, scroll, press, flick, and pinch. The touchscreen display interface 110 detects these single and multi-touch actions, for example through the generation of a signal or signals in response to a touch, which may then be processed by the processor 102 or by an additional processor or processors in the device 100 to determine the location of the touch action, whether defined by horizontal and vertical screen position data or other position data. Touch location data may include an area of contact or a single point of contact, such as a point at or near a center of the area of contact. The touchscreen display interface 110 may be provided with separate horizontal and vertical sensors or detectors to assist in identifying the location of a touch. A signal is provided to the controller 216, shown in FIG. 1, in response to detection of a touch. The controller 216 and/or the processor 102 may detect a touch by any suitable contact member on the touch-sensitive display 110.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) or another suitable identity module to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with.

The connect module 144 includes a set of Application Programming Interfaces (APIs) that can be integrated with the communication device 100 to allow the communication device 100 to use any number of services associated with the enterprise system or with other systems accessible over the network 200. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols.

When operating the communication device 100, the user may wish to have e-mail messages retrieved for delivery to the communication device 100. The message application 138 operating on the communication device 100 can also request messages associated with the user's account over the network 200. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by a message server.

A computing device such as the communication device 100 described above, which as noted previously may comprise any one of a number of different types of data processing or communication devices, may be controllable by the user by means of one or more user input systems, such as a user input device or interface, including without limitation the keyboard 116, display 110 where the display is comprised in a touchscreen interface, microphone 120, trackball, buttons, trackpad, scroll wheel, and the like. These user input devices may be external to the computing device itself; for example, a pointing device such as a mouse, trackball, tablet or touchpad may be provided as a peripheral component. In the case of a mobile device such as a smartphone or tablet computer, the user input devices or interfaces are advantageously incorporated into the computing device itself, rather than provided as an external device. These various user input devices and interfaces may be actuated by the user (for example, through the application of touch or pressure) to control the operation of the computing device, for example to navigate through graphical user interfaces, menu structures, and the like, to select and initiate application or operating system commands for execution, and to input data for processing or transmission by the computing device. User input received via the input interfaces or devices may thus be used to control the operation of an application, or to change settings on the computing device.

For example, applications available for execution on the computing device may include messaging applications for use in association with the email, voice mail, SMS and MMS services mentioned above, as well as for use with other network messaging services, including both server-based and peer-to-peer messaging. Other PIM applications may also be provided, and may be integrated with location-based services. User input may thus be used not only to compose messages for transmission from the computing device, but also to initiate transmission, and to retrieve and present messages at the computing device via an output interface (such as via the display 110 or speaker 118). Similarly, user input may be used to compose, save, transmit and retrieve for display calendar-based data objects such as appointments, meeting invitations, tasks, and alarms.

Other examples of applications that may be available for execution on the device can include media players for playback of music or sound files, video files, as well as viewers or readers for presentation of text information, such as e-book applications. The user may select files for display or playback, by way of input commands. For example, menu commands or graphical user interface elements may be selected and actuated in order to instruct a media player to change tracks.

The data retrieved and rendered for presentation to the user may be stored in local storage at the computing device, for example in flash memory 108. In some cases, the data may be streamed from a remote location, such as a web server or media server accessible over a wireless or fixed network. Other applications on the device, such as browser applications or mapping and geolocation applications, may also retrieve data over a network in response to user commands.

Other operations that may be carried out at the computing device include alteration of settings, such as audio and visual notification preferences. For example, a user may wish to change the audio, visual or vibrate ringer notifications for incoming telephone calls or change audio, visual or vibrate notifications for incoming messages. As a specific example, a user may wish to turn off the audio ringer notification and switch to a vibrate ringer notification. The foregoing examples of applications, user commands, and other operations are non-exhaustive. Other tasks, operations, and applications that may be implemented on computing devices such as the exemplary mobile communication device described above will be known to those skilled in the art.

During use, the various user input systems typically consume a small amount of power from the battery 130 or other computing device power source. To preserve battery life or otherwise reduce power consumption by the computing device, the device may enter into a "sleep" mode (or "standby" or "inactive" mode), in which certain functions of the computing device or its peripherals are halted or suspended pending reactivation by the user. For example, in a personal computer including a separate processor unit, monitor, keyboard and pointing device, after a predetermined period of inactivity (e.g., a period of time during which no user input is received) detected by the computer's processor, a signal may be sent to the monitor to enter into a screen saver mode, reducing its power consumption, or to enter a sleep mode, in which it receives little to no power. In addition to automatically entering sleep mode after a timeout is detected in this manner, the computer may be expressly placed in sleep mode through a user command, for example invocation of a menu option, a predefined keystroke combination, movement of a cursor (by means of a pointing device) to a particular location on the display, and so forth. The processor itself may also halt certain processes or disk (or other local storage) activity until a signal is received from the user to "wake up", or to reactivate the various processes or the monitor. The signal may be received from one of the user input interface devices, such as the keyboard or the pointing device; for example, clicking a button on the pointing device, or depressing a key on the keyboard, may be sufficient to "wake up" the computer and reactivate the monitor and other processes.

Similarly, in computing devices with integrated displays 110 (such as in a smartphone or tablet computer) to conserve power the device may be configured to enter a sleep mode in which the screen is blanked, either automatically upon detection of a period of inactivity or in response to an express command. The screen may be reactivated upon detection of an input received via a user input interface that may also be integrated into the device, such as the keypad or a convenience key. In the case of a computing device equipped with a touchscreen display, one of the primary user input interfaces may be the touchscreen interface. The entire touchscreen interface, including the display component as well as the touch-sensitive component of the interface, may be inactivated in sleep mode to reduce power consumption. Other user input interfaces on the device, such as optical joysticks, trackballs, scroll wheels, capacitive components such as touchpads and buttons, keyboards, and other buttons utilizing other types of switch technology, may also be configured to be inactivated while in sleep mode, leaving only select ones of the input interfaces sufficiently powered (i.e., active) to detect a user input. When a user input is detected via one of those active input interfaces, the processor 102 can then be signalled to reactivate the other input interfaces on the device and return the device to an awake and operative state.

In a simple embodiment, the sleep mode simply conserves power. Sleep mode may be combined with a secure or locked state that enhances the security of the device, by making the device's functions or data, or both, accessible only if the correct security code, such as a PIN or password, has been entered by the user. The security code may be an alphanumeric key that may be input using the keyboard 116 or a virtual keyboard displayed on a touchscreen interface, or it may be a defined sequence of user manipulation of various input mechanisms (for example, a particular sequence of button presses). In the case of a computing device with a touchscreen or touchpad interface, the security code may be one or more gestures or symbols traced on the touchscreen or touchpad surface, and detected by sensing the contact or pressure by the interface. Correct entry of the security code places the device in an insecure state in which the device's data and functions are accessible.

This secure or locked state may include activating of content protection on the device, if content protection is enabled. The PIN or password, or a value derived from the security code, can be used to encrypt user data stored on the device as well. For example, the security code or a value derived therefrom may be used to decrypt an encryption key stored at the computing device, which can then be stored in temporary memory and used to decrypt encrypted data and encrypt plaintext data during the current session. Again, after a period of user input inactivity or in response to an instruction, the device may enter the secure state, in which any unencrypted data that is marked for content protection is encrypted, and the encryption key (and the security code, if it is still stored in memory) deleted from memory. In addition, the secure state can be combined with the sleep mode; upon the expiry of the period of inactivity or upon receipt of an express instruction, the computing device not only enters the secure state, but the display 110 may also be blanked, and power may be cut off or reduced to other user input and output interfaces. Thus, when the user subsequently wishes to use the computing device, the user must again input the security code to obtain access to functions or data on the device. Further, where the user input interface used for entering the security code has been powered down in sleep mode, this particular user input interface must also be woken up, i.e., powered up and placed in a state in which it can receive user input. In the secure state, then, access to at least some functions or data—whether the functionality of one of the user input interfaces, the functionality of an application normally executable on the device, or access to the data stored on the device—is disabled or inactivated, and some or all of these disabled or inactivated features are not accessible until the appropriate security code has been received and verified by the device. When the appropriate security code has been received and verified, and full access to functions and data is available, the device is typically considered to be in an "unlocked" or insecure state. Techniques for verifying security codes and the like will be known to those skilled in the art.

Figure 3:
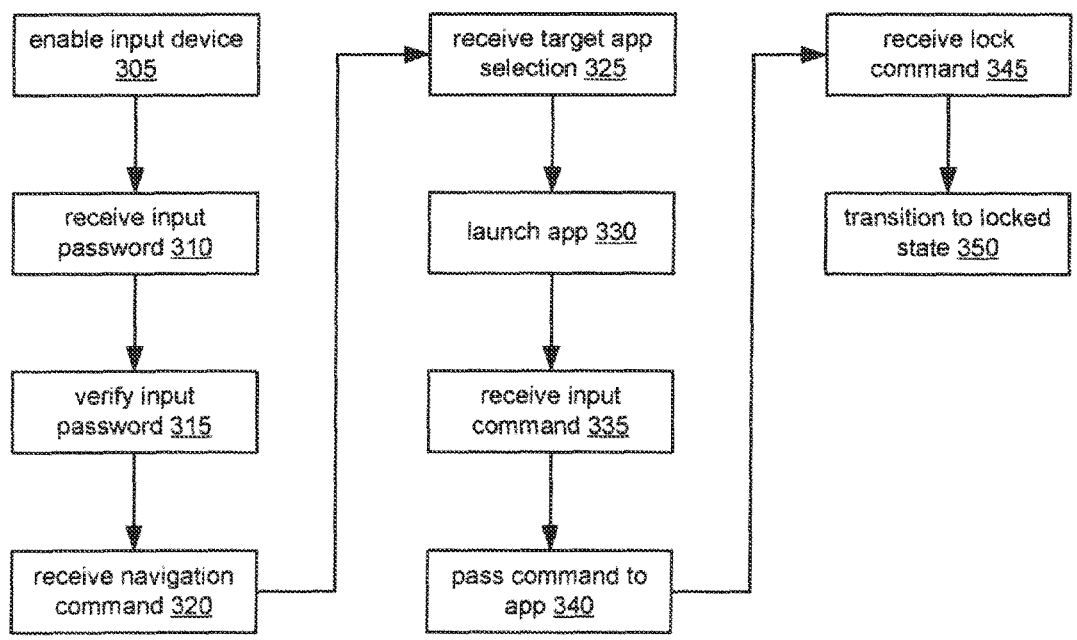
FIG. 3 is a flowchart of a prior art method of using a computing device.

Despite the advantages of providing a computing device that can be transitioned to a secure or locked state, there may be attendant inconveniences to users wishing to obtain quick access to select device features. An example of a prior art process that may be implemented on a computing device such as a smartphone is illustrated in FIG. 3. The smartphone is initially in a locked state, with a user input interface (such as the keyboard 116) in a powered down or disabled state. If a user wishes to operate the device, the user input interface must first be enabled at block 305, for example by detecting actuation of a designated button or other user interface component on the device; the device must then receive via the user input interface the password or other security code at 310; the input password or other security code must then be verified at 315. Upon verification, the device is transitioned to an insecure or unlocked state in which access to functions and/or data is permitted, at which stage the device can receive a navigation command at 320, if necessary, so that the user can select a target application for launch at 325. As two non-limiting examples, the target application may be a messaging application or a media player application. The application that is selected is then launched at 330. At 335, the device then receives an input command from the user via a user input interface; the input command may be received at a keyboard, trackpad, scroll wheel, or any other suitable interface. For example, the command may be a command to display the most recently received message, or it may be a command to select a particular track for playback. At 340, the command is passed to the application for execution. The navigation command, the selection of the target application, or application launch may not be required; for example, if an application is already executing at the device when it transitions to the unlocked state, the user interface for the application may already be displayed in the device, and the device may be ready to receive commands to execute using that application. If the application is executing in the background, selection of the appropriate target application and retrieval and rendering of the user interface screen associated with that application may be necessary, although it will not be necessary to launch the application. Even if one or more of those steps is omitted, it can be seen that the process for a user to initiate a change to a state of a given application is onerous; the user input interface must be enabled if it is disabled, a password or other security code must be input; and at least one further input is required, such as input of the command to be passed to the application.

Further, even once these steps are complete and the user has effected the desired operation, the device remains in the unlocked state until a timeout condition is reached (by a period of user inactivity) or until an express command is received to lock the device, as represented by block 345. Finally, the device then transitions to the locked state at 350. If the user neglects to invoke the lock command, then the device remains insecure for at least some brief period of time, which increases the risk of unauthorized access. This is particularly undesirable when content protection on the device is employed on the device, and is disabled while the device is in the unlocked state, since unauthorized users may gain access to decrypted data.

Figure 4A:
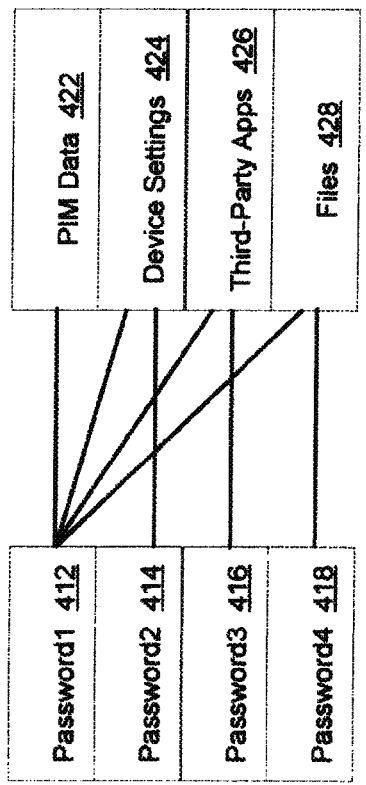
FIGS. 4A and 4B are schematic diagrams illustrating correspondence between passwords and data or settings at a computing device.
Figure 4B:
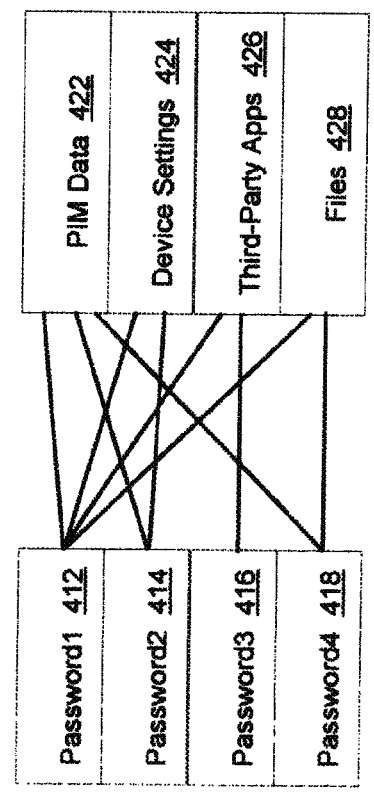

Therefore, the device may be configured to carry out operations in response to a plurality of input security codes in a manner that bypasses the need for additional stages of user input to navigate, select target applications, enter commands, and so forth. A plurality of security codes is defined, and associated with sets or subsets of data or functions available on the device. Referring to FIG. 4A, security codes such as passwords may be associated as follows: a first password 412 may be associated with all data and applications or functions on the computing device 100, such as PIM data and applications 422 (e.g., message stores, address books, calendar stores, and the like), as well as device settings 424 (such as ring tones), third-party applications 426 (such as social networking applications, mapping and geolocation applications, and other applications that may not be provided as a native application or operating system function); and files 426 that may be stored on an expansion card or other storage medium provided on the device. A second password 414 would be associated with only device settings 424, while a third password 416 is associated with only third-party applications 426, and a fourth password 418 is associated with files 426. These examples are non-limiting; there may be additional passwords, and indeed any one of the additional passwords 414, 416, 418 may be associated with multiple sets of functions or data. For example, the third password 416 may be associated not only with third-party applications 426, but also with files 428. Further, each of these security codes may be associated with a command associated with its corresponding data set. For example, while the first password 412 may simply comprise a password that is used to gain access to all data and functions on the device, the second password 414 may be associated specifically with a command to alter a specific device setting 424, such as a ringtone or other visual, aural, tactile or other indicator used to alert the user to an event such as receipt of a new message or telephone call. The third password 416 may be associated with a command to launch a specific application, while the fourth password 418 is associated with a specific file and a command to launch an application for viewing the file. FIG. 4B illustrates an alternative association between diverse passwords 412, 414, 416, 418 and the same data, applications and functions identified in FIG. 4A. In this example, the additional passwords 414, 418 are also associated with multiple sets of data or actions; the second password 414 is associated with both PIM data 422 and device settings 424, while the fourth password 418 is associated with the PIM data 422 and files 428.

Each of these security codes and their associated command is stored in a storage device, such as flash memory or other non-volatile memory, at the computing device 100. Thus, while the device is in locked mode, it may receive an input security code sequence. Upon receipt of the input sequence, the device validates the input sequence by comparing the sequence to the stored security codes. If one of the security codes match, that input sequence is validated, and the corresponding command is then retrieved and executed at the device. Thus, the user need not navigate any menu structure or select a particular application or file; the device can automatically carry out the desired operation associated with the input security code without awaiting further user input. Further, the device may remain in a locked state, in which user interface access to data or functions is still restricted; for example, as soon as the desired operation is carried out, the device may return to the original locked state. Alternatively, while the desired operation is carried out at the computing device, all other functions or data remain in a restricted state, and then once execution of the command is completed, the device returns to the original locked state. In this way, the inherent risk of the device remaining unlocked is reduced.

Each of the security codes 412, 414, 416, 418 may be different. However, this increases the burden on the user to memorize a number of different passwords. Thus, in a further embodiment, the various security codes 412, 414, 416, 418 each comprise at least an authentication code, and optionally a command code. The authentication code remains consistent for each of the security codes, and only the command code portion will differ between each security code. Further, the command code may also comprise an argument that can be passed to an application or to the device's operating system. Examples of authentication codes and command codes are illustrated in Table 1, below:

TABLE 1

| Command Code | Authentication Code | Command |
|---|---|---|
| t1, t2 . . . tn | lrU73 | skip to track 1, 2 . . . n of the current album being played by a media player |
| sh | lrU73 | play songs in shuffle mode |
| n | lrU73 | play next song in playlist/album |
| s | lrU73 | change device setting to silent mode |
| v | lrU73 | change device setting to vibrate mode |
| m | lrU73 | view newly received message |
| fb | lrU73 | launch social networking application |

Thus, for example, when the device is in a locked state and the user wishes to switch the device to a "silent" mode, in which ringers and other audible or vibratory notification mechanisms are disabled, the user may enter, using an appropriate user input interface, the security code string "slrU73". When the device detects the input security code the "s" is interpreted as a command to change the device notification setting to silent mode, and the "lrU73" portion of the security code is verified to confirm that the user entering the security code has sufficient authorization to do so. Other command codes may be associated with other applications or instructions; in this example, entering "t1lrU73" comprises an instruction to be passed to a media player application to skip to track 1 of an album or playlist that is currently being played back by the device. The security code "t1lrU73" thus includes a command code that has a command portion, "t", as well as an argument, "1", that may be passed to the executing media player application. The command code is thus associated with a media player application, and the command comprises an instruction to play a media file associated with the command code. The structure of the security codes can be such that the command portion and optionally the argument is included either at beginning or the end of the security code string, or inserted within the string.

As another example, while the device is locked, the device may still be configured to alert the user to the receipt of a new message. This alert may take the form of an audible, visual, or vibratory notification; for example, the device may be configured to vibrate, cause a light emitting diode to flash in a different colour, or display a special icon in a graphical user interface in the display 110. Normally, to view the newly received message, the user must unlock the device, invoke the messaging application, and select the newly received message for viewing. In this embodiment, however, while the device is locked, the user may simply type in the security code "mlrU73". The "m" portion is then interpreted by the device as a command code associated with launch of the messaging application (or with displaying the messaging application user interface screen, if the messaging application is already executing on the device), and the "lrU73" authentication code is used to verify that the user has sufficient authorization to access data on the device. The command code is thus associated with the messaging application and comprises an instruction to display a newly received message using the messaging application. Upon verification, the device may then invoke the messaging application and automatically display the newly received message. When the viewer is finished viewing the message, the user may dismiss the message view (i.e., remove the message from the display) by actuating a user interface element (for example, by pressing an escape key or return key on the device, or by actuating a user interface element such as an "OK" or "Close" button displayed on the display 110). When the message is dismissed, the device returns to the locked or restricted mode.

As another example, a user may wish to access a social networking service using an application on the device to compose a post or message for sending to the service. Thus, entering the code "fblrU73" is interpreted by the device as a command to invoke an associated social networking application, and to launch a view of the application for text entry. The command code is thus associated with a social networking application, and the command comprises an instruction to display a text input user interface for composing a message for sending using the social networking application. When the user is finished with text entry and initiates transmission of the message to the social networking service, the application can automatically close, and the device can then return to the locked mode. In this way, the user is not required to remember to lock the device when finished using the application. In each case, the device may also close the application after a period of inactivity and return in the locked state.

Finally, as a further non-limiting example, the command code may be associated with a computing device setting such as ringtone or other visual, aural, tactile or other indicator used to alert the user to an event such as receipt of a new message or telephone call, or another setting such as a battery conservation state, display backlight setting, and the like, and the command itself may comprise an instruction to change the computing device setting to a different value.

In these examples, each of the command codes and the authentication code are alphanumeric codes. It will be appreciated by those skilled in the art that the command code can be appended to either the beginning or the end of the authentication code. In still another embodiment, the command code is inserted within the authentication code. Further, while the exemplary authentication code used above is a mix of lower case and upper case alphabetic characters as well as numeric characters, a simpler code could be used; for example, the authentication code may be a simple string of numbers or lower case letters. Typically, when the user enters a security code, which can be done for example at a keyboard or a touchscreen of the computing device, the user signifies that the entire security code has been input by pressing a return or enter key (on a keyboard) or by actuating a user interface element, such as an "OK" or "submit" button displayed on a device display 110.

Figure 5:
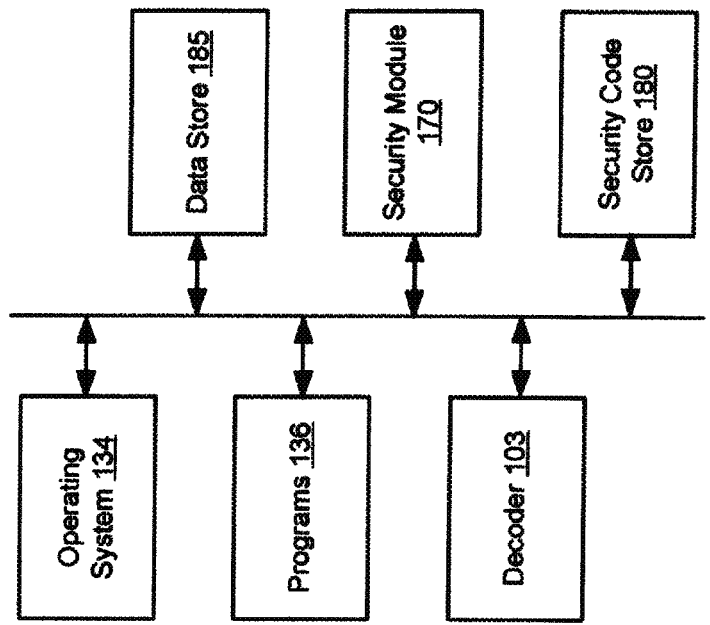
FIG. 5 is a further block diagram of select features of a computing device.
Figure 6:
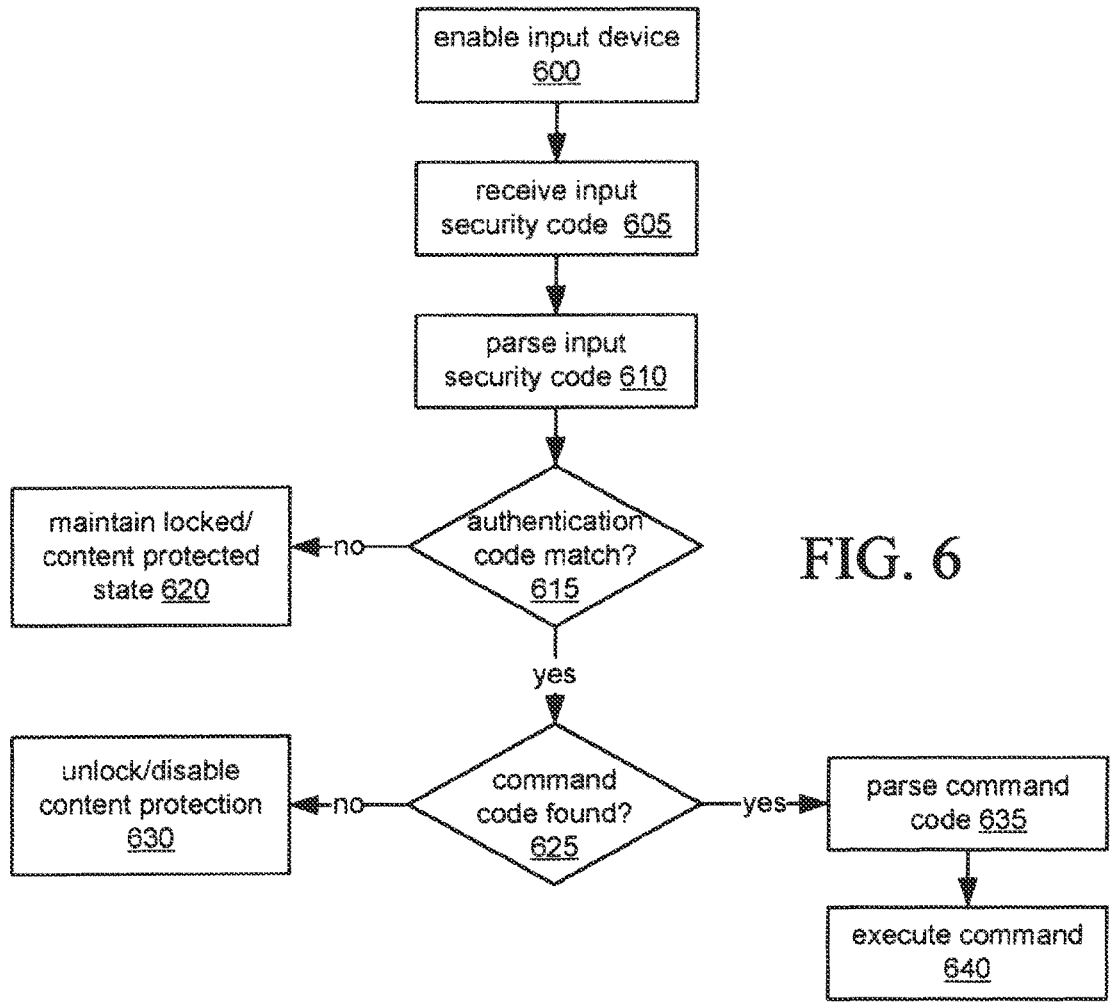
FIG. 6 is a flowchart illustrating detection of an authentication code and command code.
Figure 7:
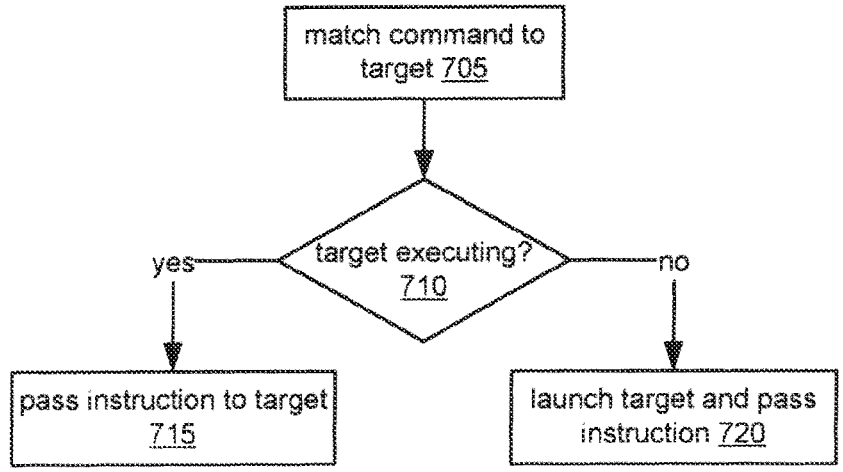
FIG. 7 is a flowchart illustrating passing a command to an application.

FIG. 5 is a further schematic diagram of specific components of a computing device, some of which are included in FIG. 1, and others of which may be implemented in addition to or in place of other features of FIG. 1. A security module 170 is provided in the computing device 100, in communication with other features such as the operating system 134, programs 136, decoder 103, a data store 185 which may comprise flash storage or other non-volatile memory for user data, device settings, and the like, and a security store 180 which may be comprised in the non-volatile memory, and optionally in a secure memory area. FIG. 6 illustrates a possible method implementing these security codes on a computing device 100. The device is initially in a locked state, and possibly user input interfaces, such as keyboards, touchscreens, and the like, may be disabled. At 600, a user input interface is enabled so that user input can be received. In this input enabled state, however, the device remains in a locked state as well, in that access to data and functions remains restricted as in the initial state. At 605, an input security code is received at the device. At 610, the security code is parsed, for example by the security module 170, to identify the authentication code portion and the command code portion, if any. The identification of the authentication code may be carried out by simply matching any component of the input security code with an authentication code already stored at the device in the security code store 180. The process of matching an input code to a stored authentication code will be known to those skilled in the art. In some embodiments, for example, the authentication code portion of the security code may be hashed prior to comparison to the stored authentication code, which is stored in hashed form.

If either the command codes or authentication codes used at the computing device are of constant length (for example, all permitted authentication codes may be limited to four or six characters, or else all permitted command codes may be three characters long), then the security module 170, when parsing the input security code, can split the input string into its constituent command and authentication codes. Parsing the string may simply require splitting the input string at a predefined offset, where the length of either the command code, the command code with optional argument, or authentication code is already known. If the command code (and optional argument) is inserted within the authentication code, then again if the offset of the command code within the authentication code string is known, and if the length of the command code, command code with optional argument, or authentication code is known, then the security code may be parsed by splitting the input string into its constituent parts. The authentication code portion may be formed by concatenating the portions of the authentication code that preceded and followed the command code.

However, if both codes may be of varying length, the input security code may also comprise a delimiter to distinguish between the two components of the code. For example, rather than "fblrU73", the security code may include the delimiter "00", so the device can parse the input security code by splitting the input code at the "00".

At 615, it is determined by the security module 170 whether the authentication code received in the security code matches the stored authentication code. If there is no match, then the device is maintained in its locked state, and no command is executed. If the authentication code does match, then at 625 the security module 170 determines whether the security code comprised a command code. If there was no command code, then the input security code comprised only the authentication code. Thus, the security module 170 causes the device to transition to an unlocked state, in which access to all data in the data store 185, programs 136 and other functions is permitted, at 630. In this state, the device does not return to the locked state unless there is a user inactivity timeout or an express command to re-enter the locked state, as described above.

If, however, a command code is found in the security code, then at 635 the command code is parsed if necessary, for example if the code includes an argument to be passed in an instruction to an application. At 640, the command is executed.

Executing the command may involve the execution of further steps on the device. Turning to FIG. 6, the command identified by the command code is matched to a target application at 705. This may comprise using the command code to look up an identifier of an associated application stored at the device. Once the target application is identified, it is determined whether the application is already executing on the device. If the target application is already executing on the device, the command may be passed for example by way of a process-to-process communication technique, as is known to a person skilled in the art, to the executing application, at 715. For example, if a command is detected to instruct a media player application to skip to the next song in a playlist and the media player application is already executing, on the device, the command to skip to the next song is passed to the executing music player application. Alternatively, if the target application of the command is not already executing, the application may be launched and the command passed to the application once launched at 720.

Figure 8:
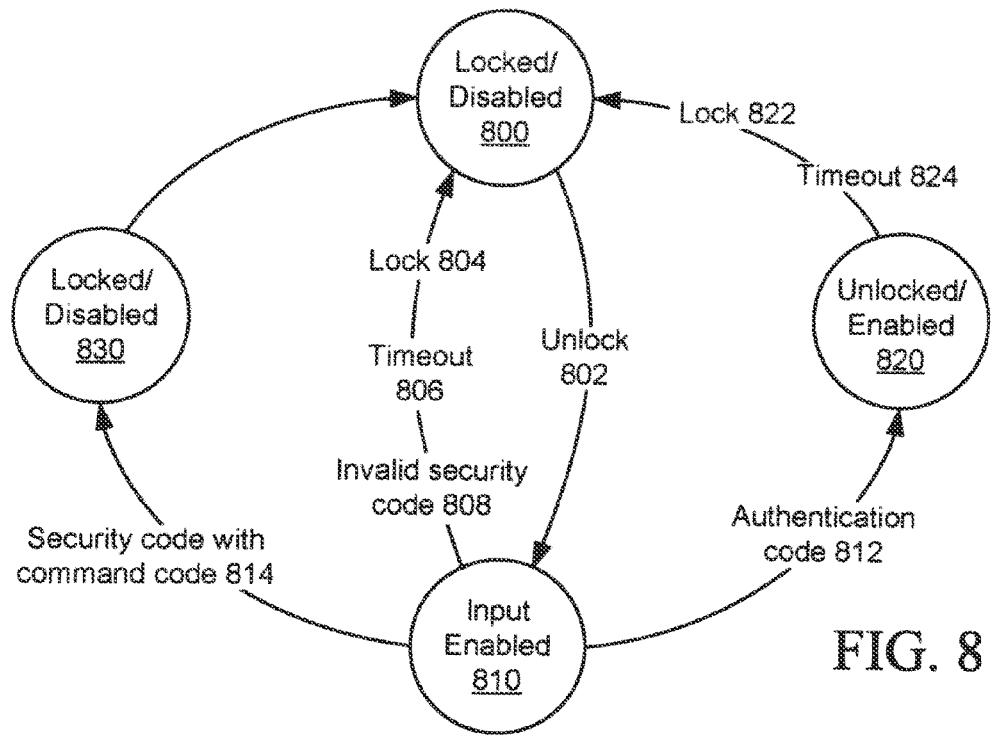
FIG. 8 is a state diagram of a device operating using security codes.

FIG. 8 illustrates a state diagram for the device invoking the above method. The device starts in a locked state 800, in which user input interfaces may also be disabled. In response to an unlock command or instruction 802 as described above, the device transitions to an input enabled state 810, in which state it is able to receive an input security code. In the input enabled state, the device remains locked with access to data and functions restricted, as described above. The device may transition back to the locked and disabled state 800 if an inactivity timeout 806 is detected, or if a lock command 804 is received. While in the input enabled state 810, a security code is input. If the received security code comprises only the authentication code 812 and the authentication code is valid, then the device transitions to the unlocked state 820, in which not only are user input interfaces enabled, but access to all functions and data is permitted. Again, as a result of an express lock command 822 or an inactivity timeout 824, the device may transition back to the locked state 800. If, in the input enabled state, an invalid security code is received (for example, the authentication code is incorrect, or the authentication code is correct but the command code portion is not valid), the device may again transition to the locked state 800.

If, however, the security code 814 received at the device includes a command code as well as the authentication code, and both are valid, then the device transitions to a second locked state 830, in which state the device is able to carry out the operation or command identified by the command code. Thus, it will be appreciated that while the user may not actually have user interface access to functions or data such that data is actually viewable on the device, or such that menu or navigation options or a graphical user interface is accessible on the device, limited access to data or functions is made available by means of the command passed directly to the application associated with the command. In some cases, this application is currently executing on the device; thus, the limited access provided in the second locked state 830 is limited access only to that data or those functions associated with that currently executing application. Further, this limited access may terminate upon completion of the execution of the command, at which point the device transitions automatically to the original locked state 800.

As mentioned above, content protection may be implemented at the device such that data stored on the device is encrypted while the device is in the locked state. The encrypted data may be decrypted as needed when the device is in the unlocked state. Not all data stored at the computing device need be encrypted. For example, music and other media files may be stored unencrypted, while other data of a potentially more sensitive nature, such as PIM data, is stored in encrypted form. Also, messages that are received at the device may be encrypted after receipt, but prior to storage.

Also as mentioned above, the security code input at the device, or a value derived from the security code, may be used to decrypt the data, or to decrypt an encryption key to be used to decrypt the data. If the security code comprises at least an authentication code, the authentication code may be used to decrypt data or decrypt the encryption key. This additional content protection enhancement is illustrated in the flowchart of FIG. 6; if, after receipt of an input security code, the authentication code is verified at 615 and there is no command code found at 625, then the device is transitioned to the unlocked state at 630. In this unlocked state, content protection may be disabled, i.e., the encryption key may be obtained by the device and used to decrypt any encrypted data required for the operation of the device. When the device returns to the locked state, content protection is enabled again, and any unencrypted data that is intended to be stored in encrypted form is re-encrypted.

Figure 9:
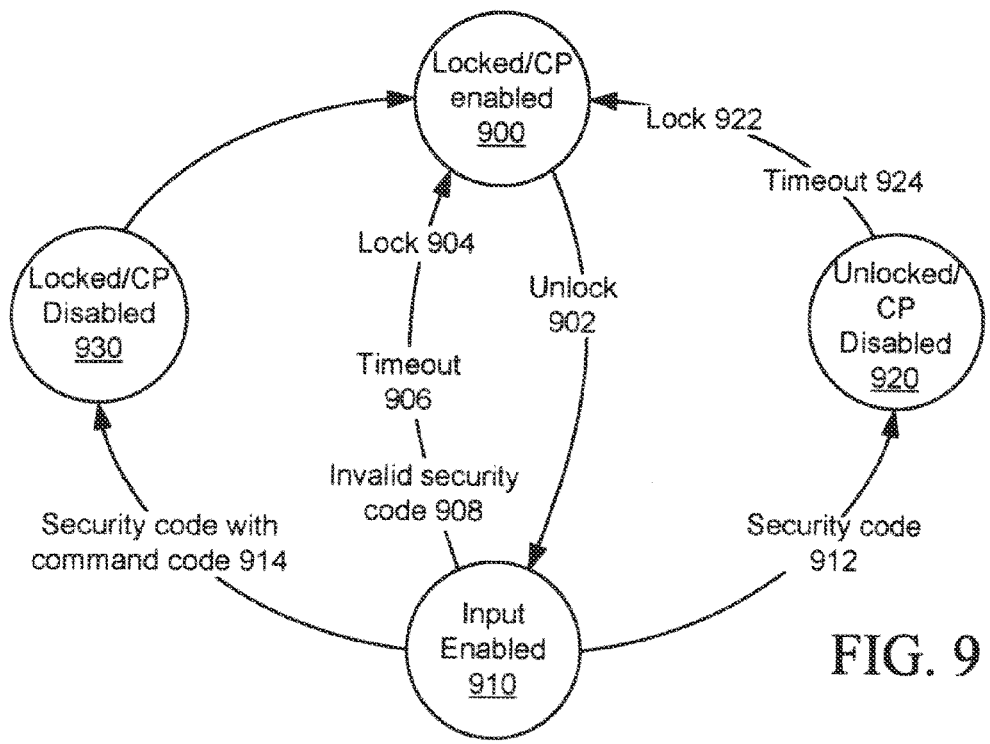
FIG. 9 is a further state diagram of a device operating using security codes and content protection.

FIG. 9 illustrates various states for a device with content protection. In a first state 800, content protection is enabled (i.e., the device is in the locked state). User input interfaces may also be disabled at the device. In response to an unlock command or instruction 902 as described above, the device transitions to an input enabled state 910, in which state it is able to receive an input security code. In the input enabled state 910 the device remains locked, with content protection still enabled. As before, the device may transition back to the locked state 900 with content protection still enabled if an inactivity timeout 906 is detected, if a lock command 904 is received, or if an incorrect security code is received 908. While in the input enabled state 910, a security code is input. If the received security code comprises only the authentication code 912 and the authentication code is valid, then the device transitions to the unlocked state 920, in which user input interfaces are enabled, content protection is disabled or turned off, and access to all functions and data is permitted, including access to any required encryption key to encrypt and decrypt data at the device. The authentication code comprised in the security code may thus provide a dual function: it is used not only to verify the user's authorization to access data and functions, but it is also used to disable content protection in the unlocked state 920. The device may transition back to the locked state 900 as a result of an express lock command 922 or an inactivity timeout 924.

If, however, the security code 914 received at the device includes a command code as well as the authentication code, and both are valid, then the device transitions to a second locked state 930, in which state the device is able to carry out the operation or command identified by the command code. If the required data to carry out the operation or command is encrypted, content protection must also be disabled so that the encrypted data can be decrypted for use by the device. However, to enhance the security of the device in this state, the user still may not have user interface access to functions or data such that data is actually viewable on the device, or such that menu or navigation options or a graphical user interface is accessible on the device. Rather, as with the second locked state 830 described above, limited access to data or functions is provided only because the command identified by the command code is passed directly to the application associated with the command. This locked state 930 differs from the locked state 830 in that the device may be able to decrypt encrypted data necessary for executing the command. Once the command execution is completed, however, the device returns to the original locked state 900, and content protection is again enabled, with any unencrypted data being re-encrypted. If decryption of encrypted data is not required to execute the command, however, content protection may not be disabled in the locked state 930. The locked state 930 would then resemble the locked state 830 of FIG. 8.

By allowing select commands to be executed on the device, especially in connection with applications that are invocable or already executing on the device, inconvenience to the user is reduced. Applications on the device, such as a music player or social networking applications are often interactive or operate in a real-time manner. For example, with social networking applications, a user may wish to transmit updates on his or her current activities to a social network, simultaneously with the occurrence of those activities. The security codes described herein reduce the potential delay incurred in unlocking a device, navigating to the appropriate application, and selecting the correct options so as to be able to post a status update using a social networking application.

The various command codes described above may be preset in the operating system of the device, or may alternatively be configurable by the user. Advantageously these command codes may be stored at the device separately from the authentication code, since the authentication code portion may be changed on a regular or irregular basis according to the user's security needs or security policies implemented for the computing device. Alternatively, security codes comprising both the authentication code and the command code portions are stored at the device for each different authentication code or command code (with optional argument). If the authentication code portion is later changed, then the security codes can be recomputed to use the new authentication code and re-stored at the device. The same command codes, however, may be used in connection with different authentication codes. In other embodiments, a given computing device may be used by multiple users, each with their own authentication code; however, the same command codes may be used by each user as described above, in connection with their respective authentication codes.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method, comprising:
receiving one of a plurality of security codes at a computing device via a user input interface while the computing device is in a locked state, wherein user interface access to data at the computing device is disabled in the locked state, a first one of the plurality of security codes comprising an authentication code and a second one of the plurality of security codes comprising a command code;
when the received security code is the first one of the plurality of security codes, transitioning the computing device to an unlocked state, wherein user interface access to data is enabled in the unlocked state; and
when the received security code is the second one of the plurality of security codes, maintaining the computing device in the locked state while the computing device executes a command identified by the command code.

2. The method of claim 1, wherein user interface access to data comprises display of the data on a screen of the device.

3. The method of claim 1, wherein the user input interface is a touchscreen, and the authentication code and the command code each comprise a different gesture or symbol traced on the touchscreen.

4. The method of claim 3, wherein the second one of the plurality of security codes comprises both the command code and the authentication code.

5. The method of claim 1, wherein user interface access to data at the computing device is disabled by encryption of said data, and user interface access to said data is enabled by decryption of said data.

6. The method of claim 5, wherein said data is encrypted using an encryption key, the encryption key being encrypted for storage at the computing device using the authentication code, wherein when user interface access to said data is enabled, the authentication code comprised in the received first security code is used to decrypt the encryption key, and said decrypted encryption key is used to decrypt said data.

7. The method of claim 1, wherein executing the command comprises launching an application associated with the command code at the computing device.

8. The method of claim 1, wherein executing the command comprises passing the command to an application associated with the command code executing at the computing device.

9. A method, comprising:
defining a plurality of security codes for a computing device, the computing device being configured to implement content protection, wherein when content protection is enabled, data required to carry out a command is stored in encrypted form in a storage device of the computing device, and when content protection is disabled, access to an encryption key for decrypting the data is permitted; a first one of the plurality of security codes comprising an authentication code and a second one of the plurality of security codes comprising a command code identifying the command;
receiving one of the plurality of security codes at the computing device via a user input interface while the computing device is in a first locked state, wherein user interface access to the data is disabled and content protection is enabled in the first locked state;
when the received security code is the first one of the plurality of security codes, transitioning the computing device to an unlocked state, wherein user interface access to the data is enabled and content protection is disabled in the unlocked state;
when the received security code is the second one of the plurality of security codes,
transitioning the computing device to a second locked state, wherein user interface access to the data remains disabled and content protection is disabled in the second locked state; and implementing the command identified by the command code, the implementing comprising decrypting the data.

10. The method of claim 1, wherein the second one of the plurality of security codes comprises both the command code and the authentication code.

11. A computing device, comprising:
a user input interface;
a storage device for storing data; and
a processor in operative communication with the user input interface and the storage device, the processor being configured to:
receive one of a plurality of security codes at the computing device via the user input interface while the computing device is in a locked state, wherein user interface access to data at the computing device is disabled in the locked state, a first one of the plurality of security codes comprising an authentication code and a second one of the plurality of security codes comprising a command code;
when the received security code is the first one of the plurality of security codes, transition the computing device to an unlocked state, wherein user interface access to data is enabled in the unlocked state; and
when the received security code is the second one of the plurality of security codes, maintaining the computing device in the locked state while the computing device executes a command identified by the command code.

12. The computing device of claim 11, wherein user interface access to data comprises display of the data on a screen of the device.

13. The computing device of claim 11, wherein the user input interface is a touchscreen, and the authentication code and the command code each comprise a different gesture or symbol traced on the touchscreen.

14. The computing device of claim 13, wherein the second one of the plurality of security codes comprises both the command code and the authentication code.

15. The computing device of claim 11, wherein user interface access to said data at the computing device is disabled by encryption of said data, and user interface access to said data is enabled by decryption of said data.

16. The computing device of claim 15, wherein said data is encrypted using an encryption key, the encryption key being encrypted for storage at the computing device using the authentication code, wherein when user interface access to said data is enabled, the authentication code comprised in the received first security code is used to decrypt the encryption key, and said decrypted encryption key is used to decrypt said data.

17. The computing device of claim 11, wherein executing the command comprises passing the command to an application associated with the command code executing at the computing device.

18. The computing device of claim 11, wherein the first one of the plurality of security codes comprises only the authentication code.

19. The computing device of claim 11, wherein the second one of the plurality of security codes comprises both the command code and the authentication code.

20. A non-transitory computer-readable medium storing instructions to cause one or more processors to perform operations comprising:
receiving one of a plurality of security codes at a computing device via a user input interface while the computing device is in a locked state, wherein user interface access to data at the computing device is disabled in the locked state, a first one of the plurality of security codes comprising an authentication code and a second one of the plurality of security codes comprising a command code;
when the received security code is the first one of the plurality of security codes, transitioning the computing device to an unlocked state, wherein user interface access to data is enabled in the unlocked state; and
when the received security code is the second one of the plurality of security codes, maintaining the computing device in the locked state while the computing device executes a command identified by the command code at the computing device.

21. The non-transitory computer-readable medium of claim 20, wherein user interface access to data comprises a display of the data on a screen of the device.

22. The non-transitory computer-readable medium of claim 20, wherein the user input interface is a touchscreen, and the authentication code and the command code each comprise a different gesture or symbol traced on the touchscreen.

23. The non-transitory computer-readable medium of claim 22, wherein the second one of the plurality of security codes comprises both the command code and the authentication code.

24. The non-transitory computer-readable medium of claim 20, wherein user interface access to data at the computing device is disabled by encryption of said data, and user interface access to said data is enabled by decryption of said data.

25. The non-transitory computer-readable medium of claim 24, wherein said data is encrypted using an encryption key, the encryption key being encrypted for storage at the computing device using the authentication code, wherein when user interface access to said data is enabled, the authentication code comprised in the received first security code is used to decrypt the encryption key, and said decrypted encryption key is used to decrypt said data.

26. The non-transitory computer-readable medium of claim 20, wherein executing the command comprises launching an application associated with the command code at the computing device.

27. The non-transitory computer-readable medium of claim 20, wherein executing the command comprises passing the command to an application associated with the command code executing at the computing device.

28. A non-transitory computer-readable medium storing instructions to cause one or more processors to perform operations comprising:
defining a plurality of security codes for a computing device, the computing device being configured to implement content protection, wherein when content protection is enabled, data required to carry out a command is stored in encrypted form in a storage device of the computing device, and when content protection is disabled, access to an encryption key for decrypting the data is permitted; a first one of the plurality of security codes comprising an authentication code and a second one of the plurality of security codes comprising a command code identifying the command;
receiving one of the plurality of security codes at the computing device via a user input interface while the computing device is in a first locked state, wherein user interface access to the data is disabled and content protection is enabled in the first locked state;
when the received security code is the first one of the plurality of security codes, transitioning the computing device to an unlocked state, wherein user interface access to the data is enabled and content protection is disabled in the unlocked state;

when the received security code is the second one of the plurality of security codes, transitioning the computing device to a second locked state, wherein user interface access to the data remains disabled and content protection is disabled in the second locked state; and implementing the command identified by the command code, the implementing comprising decrypting the data.

29. The non-transitory computer-readable medium of claim 20, wherein the second one of the plurality of security codes comprises both the command code and the authentication code.

* * * * *